(12) United States Patent  
Chrysanthakopoulos (10) Patent No.: US 7,698,122 B2  
(45) Date of Patent: Apr. 13, 2010

(54) CREATION AND USE OF VIRTUAL DEVICE DRIVERS ON A SERIAL BUS

(75) Inventor: Georgios Chrysanthakopoulos, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1156 days.

(21) Appl. No.: 11/004,927

(22) Filed: Dec. 7, 2004

(65) Prior Publication Data

US 2005/0086041 A1    Apr. 21, 2005

Related U.S. Application Data

(63) Continuation of application No. 09/559,531, filed on Apr. 28, 2000, now Pat. No. 6,968,307.

(51) Int. Cl.
*G06F 9/455* (2006.01)
*G06F 13/20* (2006.01)

(52) U.S. Cl. .......................................... 703/24; 710/313

(58) Field of Classification Search .................... 703/24, 703/25, 27; 710/8, 10, 104, 313
See application file for complete search history.

(56) References Cited

U.S. PATENT DOCUMENTS

| 5,717,903 | A |   | 2/1998  | Bonola          |         |
|-----------|---|---|---------|-----------------|---------|
| 5,815,678 | A | * | 9/1998  | Hoffman et al.  | 710/305 |
| 5,835,791 | A |   | 11/1998 | Goff et al.     |         |
| 5,898,859 | A | * | 4/1999  | Kardach et al.  | 703/23  |
| 5,968,152 | A | * | 10/1999 | Staats          | 710/104 |
| 5,996,050 | A |   | 11/1999 | Carter et al.   |         |
| 6,012,103 | A | * | 1/2000  | Sartore et al.  | 710/8   |
| 6,031,977 | A |   | 2/2000  | Pettus          |         |
| 6,202,155 | B1| * | 3/2001  | Tushie et al.   | 726/20  |
| 6,233,611 | B1|   | 5/2001  | Ludtke et al.   |         |
| 6,327,637 | B1|   | 12/2001 | Chang           |         |
| 6,345,241 | B1|   | 2/2002  | Brice et al.    |         |
| 6,366,964 | B1| * | 4/2002  | Shima et al.    | 710/8   |
| 6,393,493 | B1| * | 5/2002  | Madden et al.   | 719/321 |

(Continued)

OTHER PUBLICATIONS

Johansson, Peter "American National Standard for Information Systems, ANSI, Serial Bus Protocol 2 (SBP-2)", Working Draft T10 Project 1155D Revision 4, ANSI, May 19, 1998, 107 pages.*

(Continued)

*Primary Examiner*—Dwin M Craig
(74) *Attorney, Agent, or Firm*—Woodcock Washburn LLP (57) ABSTRACT

A node on a serial bus, preferably a device such as a personal computer (PC), can emulate other devices using virtual device drivers. A PC connected to a 1394 bus exposes its CROM on the bus which presents an image to other nodes on the 1394 bus and describes the functional units supported by the node. The CROM can be changed dynamically by adding unit directories to the CROM detailing peripherals connected to the PC. The PC can then be enumerated as the connected device by other PCs on the bus. The PC can emulate any desired device or even multiple devices at the same time. The invention also allows a PC to create devices that don't yet exist on the bus. The invention allows a user to create virtual device objects with device properties to have just in case a user plugs the particular device in to the PC.

19 Claims, 5 Drawing Sheets

U.S. PATENT DOCUMENTS

| | | | |
|---|---|---|---|
| 6,643,714 B1 | 11/2003 | Chrysanthakopoulos | |
| 6,671,768 B1 * | 12/2003 | Brown | 711/102 |
| 6,813,663 B1 * | 11/2004 | Brown | 710/104 |
| 6,968,307 B1 * | 11/2005 | Chrysanthakopoulos | 703/27 |
| 2001/0032275 A1 | 10/2001 | Watanabe et al. | |

OTHER PUBLICATIONS

Art Baker, "The Windows NT Device Driver Book: A Guide for Programmers", Prentice Hall, 1997, 21 pages including pp. 157-162.*

Karen Hazzah, "Writing Windows VxDs and Device Drivers" R&D Books, 1997, 23 pages including pp. 171-181.*

Dan Steinberg et al, An Empirical Analysis of the IEEE-1394 Serial Bus Protocol, pp. 58-64.

1394 Developer's Conference 1999 Agenda listing presentation of "Emulation of a 1394 Device on a Standard Platform" by Nilesh Dange, NitAl Consulting Services on Jun. 4, 1999 (document printed Jul. 22, 1999).

* cited by examiner

CREATION AND USE OF VIRTUAL DEVICE DRIVERS ON A SERIAL BUS

CROSS REFERENCE TO RELATED APPLICATIONS

This application is a continuation of prior U.S. application Ser. No. 09/559,531, filed Apr. 28, 2000, now U.S. Pat. No. 6,968,307, issued Nov. 22, 2005, the entire contents of which are incorporated herein by reference.

TECHNICAL FIELD

The present invention relates generally to the use of serial buses as a means of communication between electronic devices and, in particular, to virtual device driver implementation on a serial bus, such as a serial bus operating in conformance with the IEEE 1394 Serial Bus standard.

BACKGROUND OF THE INVENTION

Computer systems are typically comprised of a variety of different components or devices that operate together to form the resultant system. Some of the devices are supplied with the computer system initially, such as the central processing unit, and some devices can be installed into the computer system after the initial configuration of the system. The devices of the computer system are generally coupled together via interconnects which may be of several types, such as a serial bus.

Serial buses are well known in the art. A recently developed serial bus standard is the IEEE 1394 serial bus standard, disclosed in the ISO/IEC 13213 (ANSI/IEEE 1212) CSR Architecture Specification and the IEEE 1394-1995 Serial Bus Specification, the teachings of which are herein incorporated by this reference. A typical serial bus having an IEEE 1394 standard architecture is comprised of a multiplicity of nodes that are interconnected via point-to-point links, such as cables, that each connect a single node of the serial bus to another node of the serial bus. Each node is an addressable entity that can be reset and identified. Nodes are associated with respective components of the computer system and serve as interfaces between the components and communication links. Each node has a configuration ROM (CROM), the registers of which can be accessed by software residing within the computer system. The IEEE 1394 standard sets forth a general CROM format which comprises several fields. One field in particular is the unit directory. The unit directory contains information representing the functionality of units within the node, particularly the unit's software version number and its location within the node. Generally, the information in the configuration ROM is treated as static. However, U.S. Pat. No. 6,643,714 entitled "Modification and Use of Configuration Memory Used During Operation of a Serial Bus" provides a technique for dynamically changing the configuration ROM, the teachings of which are herein incorporated by this reference. This patent describes a technique of creating multiple unit directories for multiple device representation.

Device drivers are well known in the art. When a user installs a new device on to a computer system, a device driver is loaded for communication with the device. A device driver is software within an operating system that controls a device. A virtual device driver is a special type of device driver that has full access to the operating system kernel and can communicate directly to a physical port but was loaded without a hardware device being detected or enumerated by the system. A virtual device driver manipulates kernel mode code using existing hardware resources to emulate a device that is not normally present on the computer. In connection with a 1394 serial bus, a virtual driver is given more access than a traditional device driver because it is not restricted to talking to just one particular device.

Virtual device drivers are designed to handle hardware device contention between multiple processes and to translate or buffer data transfers from a virtual machine to hardware devices. A virtual machine is a self-contained operating environment that behaves as if it were a separate computer. When two or more processes attempt to access the same device, some method of contention management must be used. A virtual device driver allows each process to act as though it has exclusive access to the device. For example, a virtual printer driver would provide the printing process with a virtual printer port, and characters written to the port would be written to a print spooler. The virtual device driver would then send the job to the printer when it becomes available. Another method would be to assign the physical device to only one process at a time, so that when a process attempts to access the device while it is in use, the virtual device driver does not pass the request to the actual hardware, and the process operates as though the hardware did not exist.

Recently, virtual device drivers have been expanded to include interprocess communication. Virtual device drivers can provide the necessary mechanisms to allow a virtual machine to see a device that may not actually exist in hardware. Virtual device drivers can also implement client-server hardware management by providing an interface to a virtual machine. Virtual device drivers also virtualize input/output to the device and translate this information into commands to be sent across a network to a hardware server.

Currently, when a device is plugged into a personal computer (PC) on a 1394 bus, the 1394 bus driver interface creates a device object. Based on the device object, the so-called plug and play (PnP) subsystem loads high level device drivers that facilitate communication between the user and the device. At this time, the PC does not emulate any device, rather the PC exposes a generic CROM on the 1394 bus. Other nodes on the bus use the CROM to detect that the PC is in fact a PC. Enumeration occurs when a node on a serial bus accesses the configuration memory of another node to see what functionality the node has. The node accessing the CROM would then load a device object and device driver according to what functionality was exposed in the configuration memory. A technique that allows device emulation on a hardware platform that runs a general purpose operating system is not currently known in the art. However, such a technique would offer significant advantages over the prior art.

A further problem with current technology is the inability of devices to communicate natively, i.e., without translations, over a serial bus. For example, streaming video between two or more PCs will typically require translations at the transmitting and receiving ends of a serial bus. A first PC may have an audio video interleave (AVI) file that it wishes to send to a second PC. AVI is currently a video standard in a "WINDOWS" brand operating system. In order to send the file, the first PC would have to convert the AVI file to network packets and then stream it over the Internet protocol (IP) network. A technique that allows devices to transmit such files over a serial bus without converting the files is not currently known in the art. However, such a technique would offer significant advantages over the prior art.

SUMMARY OF THE INVENTION

The present invention provides a way for a node, such as a personal computer (PC), on a serial bus to emulate any desired device using virtual device drivers. A PC connected to a 1394 bus exposes its CROM on the bus. The CROM presents an image to other nodes on the 1394 bus and describes the functional units supported by the node. A software driver or a virtual device driver changes the CROM by adding a unit directory detailing a connected device that the node will emulate. The CROM is changed dynamically by adding unit directories to the CROM detailing peripherals connected to the PC. By changing the CROM, the PC can be enumerated as the connected device by other PCs on the bus. In this manner, the PC can instantly emulate or morph itself into any desired device. The PC can also emulate multiple devices at the same time. Therefore, the present invention is particularly useful where multiple emulation drivers need to coexist. The PC can also create virtual device objects for devices that don't yet exist on the bus. A user can trigger the creation of virtual device objects with device properties for devices that are not currently connected to the PC or are present on the 1394 serial bus. The PC may then emulate any device automatically with or without a physical device present.

DETAILED DESCRIPTION OF THE INVENTION

The present invention may be more fully described with reference to FIGS. 1-6.

Figure 1:
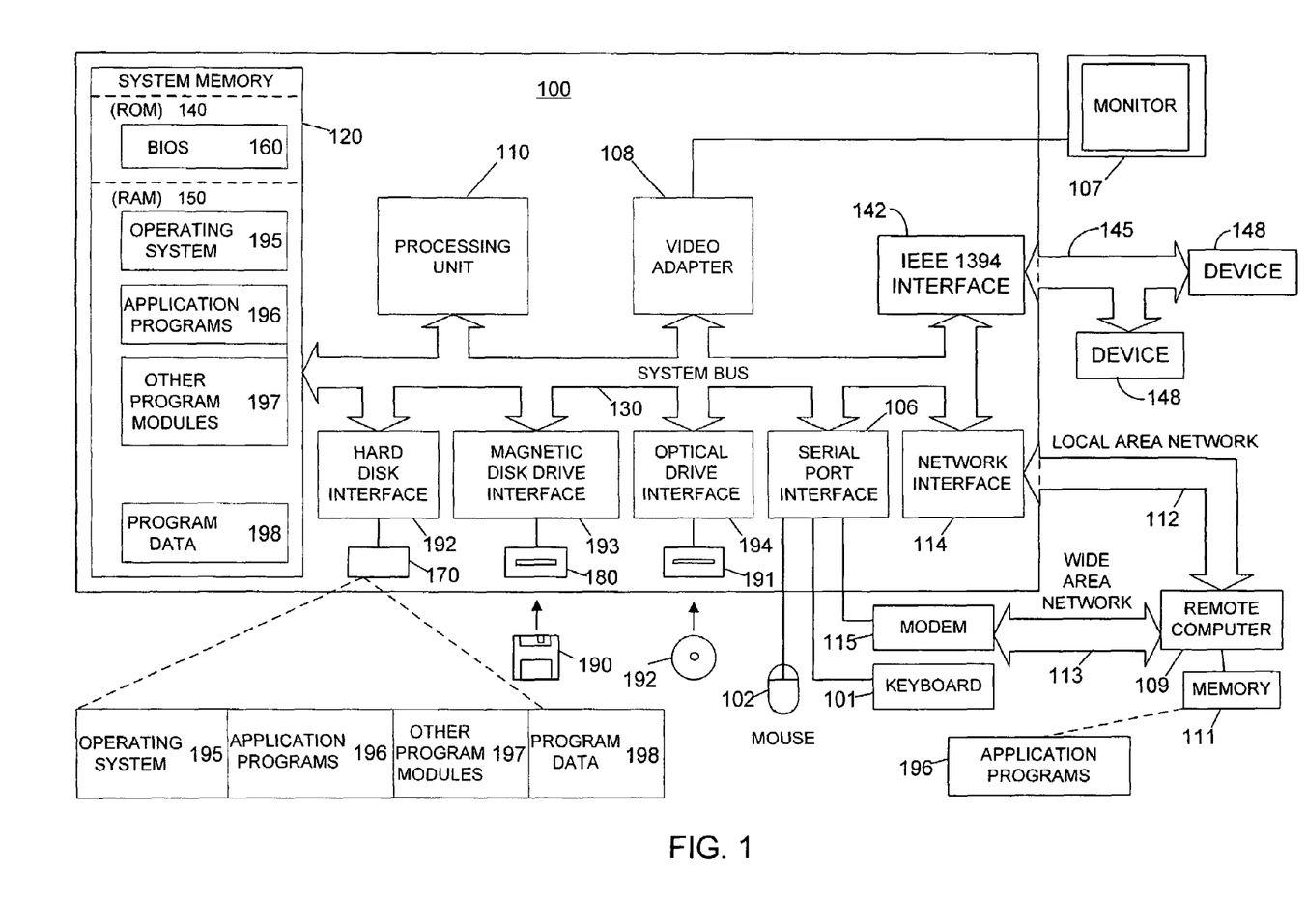
FIG. 1 is a block diagram of an exemplary operating environment.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An additional serial port in the form of an IEEE 1394 interface 142 may also be provided. The IEEE 1394 interface 142 couples an IEEE 1394-compliant serial bus 145 to the system bus 130 or similar communication bus. The IEEE 1394-compliant serial bus 145, as known in the art, allows multiple devices 148 to communicate with the computer 100 and each other using high-speed serial channels.

Computer 100 can operate in a networked environment using logical connections to one or more remote computers, such as a remote computer 109. Remote computer 109 typically includes at least some of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. For example, in an embodiment of the present invention, the remote computer 109 is a server having stored thereon one or more documents that may be accessed by the computer 100.

Procedures of the present invention described below can operate within the environment of the computer shown in FIG. 1. Although the present invention is generally applicable to a computer operating in accordance with the IEEE 1394 standard, the present invention is applicable to any computer system that implements the Control and Status Registers (CSR) configuration ROM architecture described in the IEEE 1212R CSR Architecture Specification.

Figure 2:
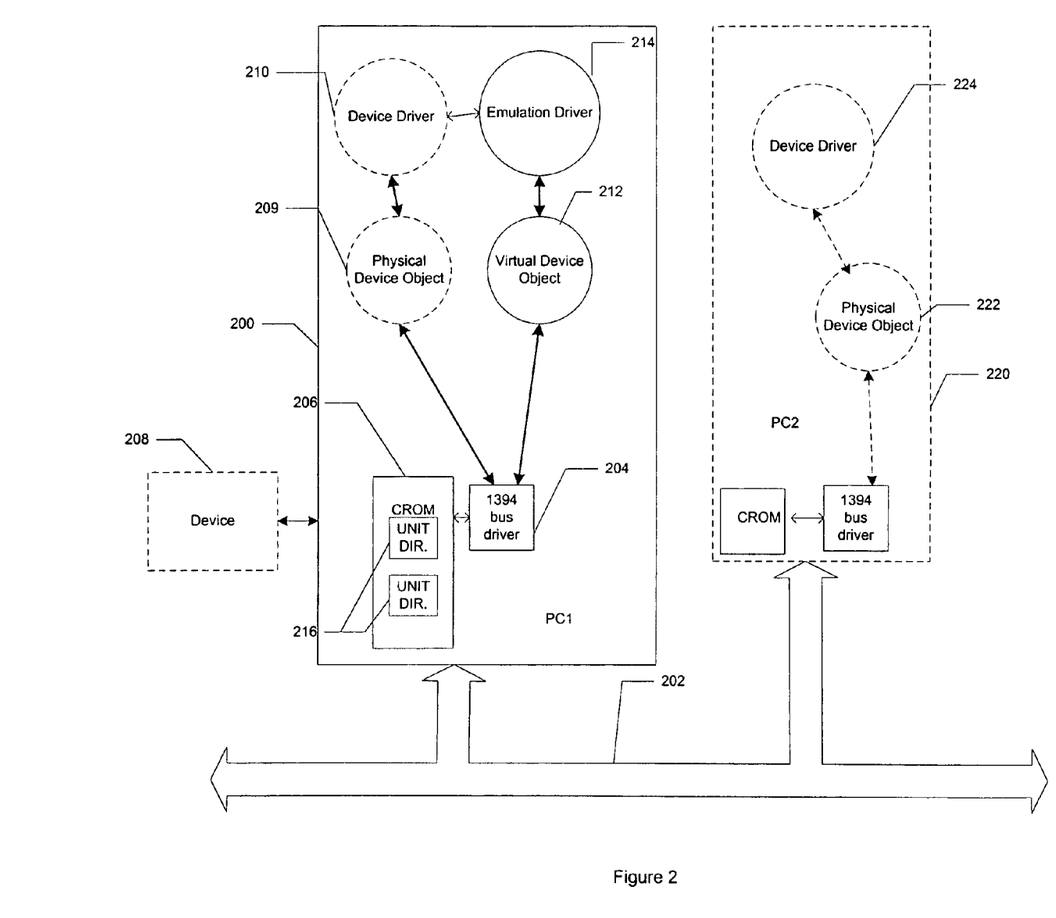
FIG. 2 is a block diagram of a system through which the present invention may be implemented.

In FIG. 2, there is a system that may be used to implement the present invention. A personal computer (PC1) 200 may be connected to a 1394 serial bus 202. PC1 200 comprises a 1394-compliant bus driver 204, which manages communications between the physical bus 202 and higher level protocol layers. PC1 200 also has a configuration memory 206 which exposes PC1's functionality on the serial bus 202. A user of PC1 200 has the option of creating a virtual device object (VDO) 212 to represent a device capable of being plugged into a PC such as a printer, scanner, DVD drive, camcorder, or the like. The VDO 212 then loads an emulation driver 214 appropriate for the device being emulated. The VDO 212 and emulation driver 214 remain present even if PC1 is rebooted. The emulation driver 214 is in communication with and can alter the configuration memory (CROM) 206 to add a unit directory 216. The unit directory 216 represents the functionality of the emulated device. The CROM 206 exposes the functionality of the device on the serial bus 202. The user may want to emulate more than one device. In this case, the user would repeat the process by creating a second VDO (not shown) with the target functionality of the newly emulated device. The second VDO would then load a second emulation driver (not shown). Several VDOs 212 and emulation drivers 214 can be created and can exist at the same time. The emulation drivers 214 continue to add unit directories to the CROM—one unit directory for each device the user wishes to emulate. PC1 200 can then emulate as many devices as it has unit directories 216.

One benefit of the present invention is that it instantly allows a PC to emulate multiple devices at the same time. Another benefit of the present invention is that it does not require that a device or another PC be plugged in to create a VDO. A user mode application sends a request that tells the 1394 bus driver to create a VDO with certain properties. The VDO can be created just in case the device is ever plugged in. The VDO loads an emulation driver that supports the target functionality of the device or implements the complete set of features, of a 1394 device. If another PC is plugged into the PC, the VDO is already present and is immediately capable of representing the complete functionality of the emulated device to another PC, or other node on the serial bus. Formerly, the PC would not be able to represent to other nodes on the serial bus functionality other than that of a physical device attached to the node.

The dotted lines in FIG. 2 represent optional elements. For purposes of a second illustration, a device 208 may be connected to PC1 200. The device 208 could be any device capable of being plugged into a PC such as a printer, a scanner, a DVD drive, or the like. For this example, the device 208 is assumed to be a USB printer. PC1 200 would have a device driver (USB printer driver) 210 that enables communication with the device 208. The user can create a VDO 212 that represents a 1394 printer even though a 1394 compliant printer is not attached to PC1 200. The user may create a VDO by modifying installation files. When a 1394 controller is detected, a VDO entry is automatically created in the registry. The VDO 212 then loads an emulation driver 214 for communication with the device 208. The emulation driver 214 actually communicates with the (USB printer) device driver 210. The VDO 212 and emulation driver 214 remain present even if the device 208 is unplugged. The emulation driver 214 is also in communication with the configuration memory 206 and can alter the configuration memory 206 by adding a unit directory 216. The unit directory 216, in accordance with the 1394 standard, describes the functionality of a device, in this case a 1394 printer.

Another node may be present on the serial bus 202, for example, a second PC (PC2) 220. When enumerating other nodes on the serial bus 202, PC2 220 accesses the configuration memory 206 of PC1 200 and reads the unit directory 216 detailing the emulated device. In response to the functionality exposed in the unit directory, PC2 220 creates a physical device object (PDO) 222 for the device, a "1394 printer." PC2 then loads the appropriate device driver 224 for communication with the "1394 printer."

In addition to being able to emulate multiple devices at one time and not requiring that a device be plugged in to emulate the device, another benefit of the present invention is that it allows "native" communication across the serial bus. In the previous example, PC2 can communicate using "native" language because it believes it is communicating with a 1394 printer instead of a USB printer. No translations are necessary because PC1's emulation driver 214 communicates directly with the USB device driver 210.

Figure 3:
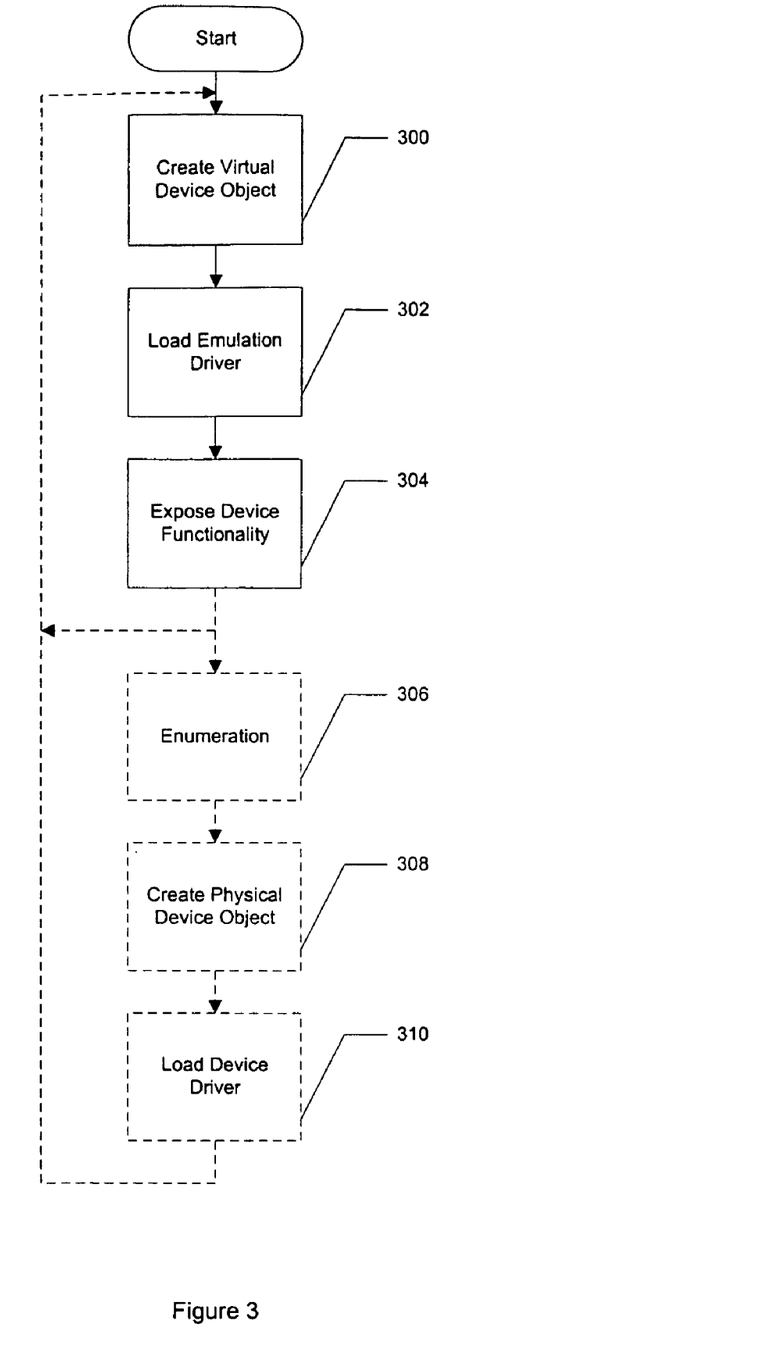
FIG. 3 is a flow chart illustrating a method of emulating a device in accordance with the present invention.

In FIG. 3, a method of emulating a device is shown. At step 300, a virtual device object is created by the 1394 bus driver. This step will be discussed in further detail in connection with FIG. 4. Then, the appropriate emulation driver relating to the device is loaded at step 302. The emulation driver has the ability to communicate with and alter the configuration memory to add device specific details to the configuration memory. The configuration memory exposes functionality of the device being emulated on the serial bus at step 304. This process can be repeated several times for each device the PC is to emulate.

The dotted portion of FIG. 3 represents optional steps. After the device functionality is exposed at step 304 on the serial bus, a bus reset can be forced. This bus reset causes all devices or nodes attached to the serial bus to enumerate each other at step 306. Any other node may now see the node with altered configuration memory as the device it has chosen to emulate. The other node then creates a physical device object for the device at step 308 and may load the appropriate device driver at step 310.

Figure 4:
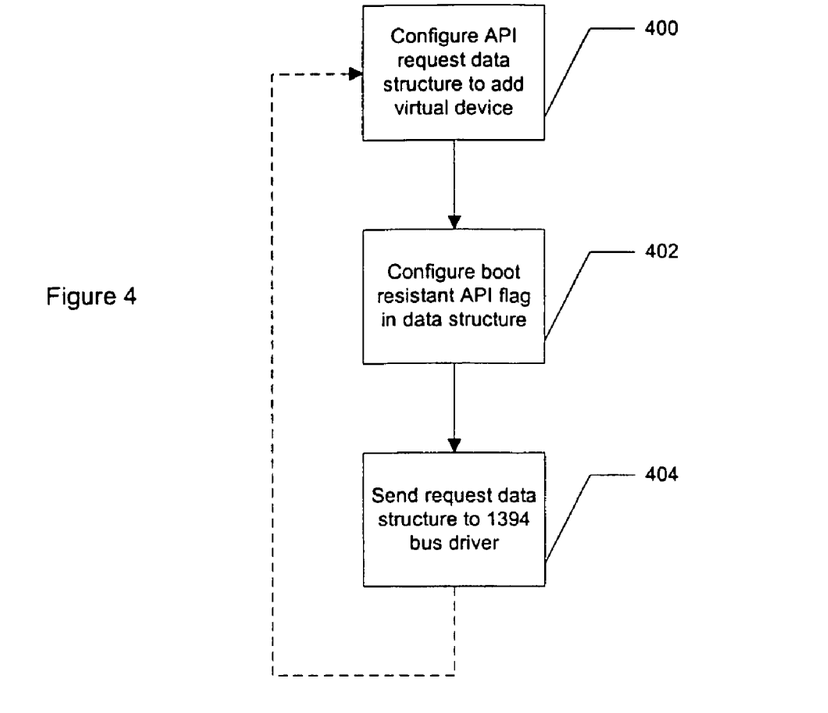
FIG. 4 is a flow chart illustrating a method of creating a virtual device in accordance with the present invention.

In FIG. 4, a method of creating a virtual device is shown. At step 400, a request in the form of a data structure is sent to the application program interface (API). The request can be sent by an upper level driver that is already loaded for a 1394 device but now it also wants to emulate a device. The request could also be sent by an application upon user request. A user might want to make his/her PC look like a DVD drive so other nodes on the 1394 bus can use it to store and retrieve data from the user's internal 1394 DVD. Using the IOCTL_IEEE1394_API_REQUEST, software can pass the following data structure to the 1394 bus driver:

```
typedef struct _IEEE1394_API_REQUEST {
    ULONG    RequestNumber;
    ULONG    Flags;
    union    {
        ...
    } u;
} IEEE1394_API_REQUEST, *PIEEE1394_API_REQUEST;
```

The data structure is comprised of at least two fields. The first field within the data structure is configured to add a virtual device by configuring IEEE1394_API_REQUEST.RequestNumber=IEEE1394_API_ADD_VIRTUAL_DEVICE. IEEE1394_API_ADD_VIRTUAL_DEVICE is further defined by the following data structure:

```
typedef struct _IEEE1394_VDEV_PNP_REQUEST{
    ULONG    FulFlags;
    ULONG    Reserved;
    ULARGE_INTEGER InstanceId;
    UCHAR    DeviceId;
} IEEE1394_VDEV_PNP_REQUEST, *PIEEE1394_VDEV_PNP_
REQUEST;
```

Once the API_REQUEST is configured to add a virtual device, then the device data structure is filled in. FulFlags is a flag that can be configured if the text string is in Unicode by setting IEEE1394_VDEV_PNP_REQUEST.FulFlags=IEEE1394_REQUEST_FLAG_UNICODE. InstanceId is a 64-bit number that can be used to identify this instance of the virtual device. DeviceId is a null terminated string to be used for generating the PnP ids required to enumerate the emulation driver.

The second field is a flag. The second field within the data structure is configured at step 402 to allow the virtual device to remain present despite a subsequent hardware or software reboot by configuring IEEE1394_API_REQUEST.Flags=IEEE1394_API_FLAG_PERSISTANT. This will guarantee that this VDO will be reported after a reboot. Then at step 404, the API request is sent to the 1394 bus driver.

Figure 5:
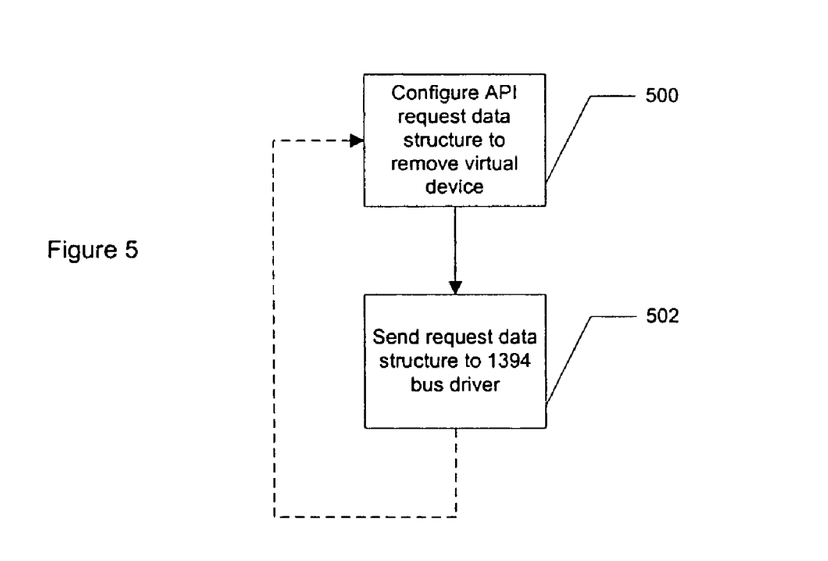
FIG. 5 is a flow chart illustrating a method of removing a virtual device in accordance with the present invention.

In FIG. 5, a method of removing a virtual device is shown. At step 500, an API request data structure is set up and the first field is configured to remove a virtual device (rather than add a device as in FIG. 4). Using the data structure described in reference to FIG. 4, the IEEE1394_API_REQUEST. Request Number = IEEE1394_API_REMOVE_VIRTUAL_DEVICE. Then at step 502, the API request data structure is sent to the 1394 bus driver. Because the IEEE1394_API_REQUEST.Flags is configured to allow the virtual device to remain present over boots when the virtual device object is added, this request is sent to remove the virtual device. The request can be a request to remove the virtual device or it can be a request to remove an entry from the registry. Existing PnP methods can also be used to remove the VDO. An IRP_MN_REMOVE_DEVICE can be sent to the driver stack enumerated on the VDO.

Figure 6:
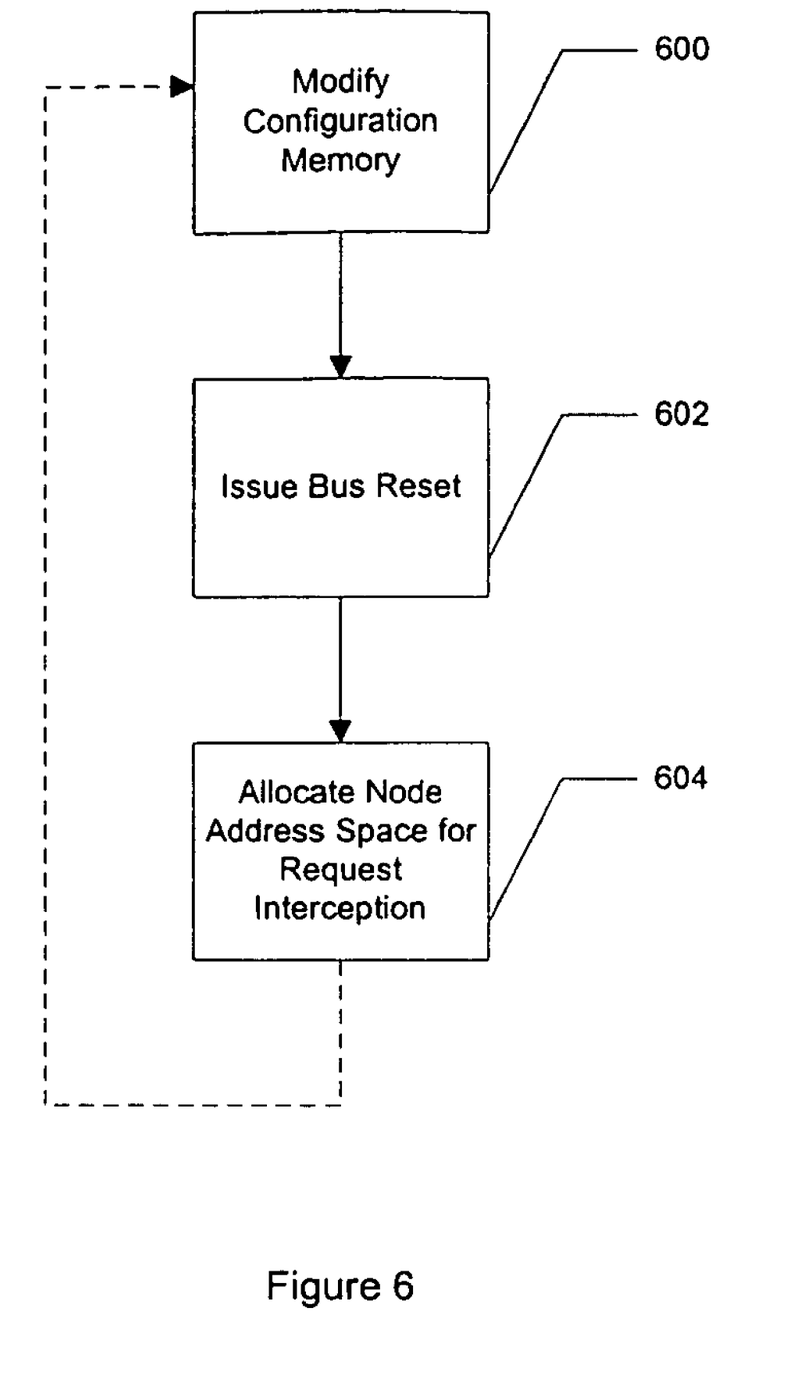
FIG. 6 is a flow chart illustrating a method of implementing an emulation driver in accordance with the present invention.

In FIG. 6, a method for implementing an emulation driver is shown. At step 600, the configuration memory is modified. One embodiment of the invention allows the configuration memory to be modified wherein the VDO submits a request to modify by using the SET_LOCAL_HOST_PROPERTIES_MODIFY_CROM request. A unit directory, in conformance with the IEEE 1394 standard, is then added to the configuration memory with the details of the device. All information of the emulated device functionality is then added or altered to expose that functionality on the serial bus.

Then, at step 602 a bus reset is issued. This step is performed to cause all nodes on the serial bus to re-enumerate each other. Any other node on the bus can then access the configuration memory and see the details of the device. The other node's operating system believes the emulated device is present. In other words, the other node can then "see" the node as the emulated device. The benefit of such a process is that the node is actually being seen as the device, rather than having a device connected to it, as was done in the past. This is a benefit because it would allow any other node on the bus to communicate "natively" with the device rather than using the node as a server/translator for the device. Then, at step 604, node address space is allocated in order to intercept requests to an emulated device register by using the REQUEST_ALLOCATE_ADDRESS. To allow any external device to access those addresses, the ACCESS_FLAG_BROADCAST must be set when allocating the addresses.

Generally, VDOs and the respective drivers have the same access to the 1394 bus driver as would a physical device object and its respective driver. However, there are differences in behavior with a VDO because there is no physical target device. Normally, the 1394 bus driver fills in the target node identifier and the appropriate packet size and transfer rate using information from the enumeration procedure with a particular device. However, in the present invention the VDO must provide all packet information because there is no target device node. For example, a REQUEST_ASYNC_READ/WRITE/LOCK will be intercepted and the VDO will fill in the address information for the request. The bus driver makes sure not to overwrite any fields. REQUEST_ALLOCATE_RANGE also exhibits different behavior if addressed to a VDO. All address allocations from an emulation driver will implicitly have the ACCESS_FLAG_BROADCAST enabled if post notification on the address range is required. This is done to allow any external node to access the address range used by the emulation driver to simulate the device. Similarly, there are requests that will not be supported because there is no device. For example, the requests REQUEST_GET_ADDR_FROM_DEVICE_OBJECT and REQUEST_SET DEVICE_XMIT_PROPERTIES are not supported for virtual devices because there is no corresponding hardware node. For all other requests, the behavior is identical between virtual and physical devices.

Although the invention has been described in relation to preferred embodiments, many variations, equivalents, modifications and other uses will become apparent to those skilled in the art. The scope of the present invention should not be limited to the specific disclosure but determined only by the appended claims.

The invention claimed is:

1. A method for emulating, on a computer, a device accessible via a serial bus, the method comprising acts of:
   in response to a request to create a virtual device, the request sent to a bus driver for the serial bus, creating a virtual device object on the computer for the device to be emulated;
   in response to creating the virtual device object, loading an emulation driver for the device to be emulated;
   modifying a configuration memory to include information about the functionality of the device to be emulated, the modifying comprising:
   submitting a request to modify by the virtual device object;
   adding a unit directory to the configuration memory; and
   altering information necessary to expose an emulated device functionality;
   in response to modifying the configuration memory, issuing a bus reset;
   allocating node address space to intercept requests to an emulated device register, wherein said modifying, issuing and allocating is performed without the emulated device being connected to the serial bus;
   receiving, via the serial bus, a command for the device being emulated;
   processing the command at the emulation driver for the device; and
   sending an indication of the command from the emulation driver to a device driver on the computer for the device being emulated.

2. A system for emulating a device, comprising in combination:

a node configured to emulate at least one device;

a configuration memory within the node;

a serial bus connected to the node, wherein the device being emulated is not connected to the bus and wherein the bus is reset in response to modification of the configuration memory; and a bus driver for controlling communications on the serial bus, wherein the bus driver, in response to a request to create a virtual device, creates at least one device object representing the device to be emulated.

3. The system of claim 2 wherein the serial bus is an IEEE-1394 compliant serial bus.

4. The system of claim 2 wherein the node further comprises:

a layered protocol stack; and wherein the configuration memory is compliant with a IEEE1212 standard and in which device functionality will be stored.

5. The system of claim 4 wherein the layered protocol stack furthers comprises:

the at least one device object in communication with the bus driver for representing the at least one device; and at least one device driver in communication with the at least one device object for interfacing with the at least one device.

6. The system of claim 5 wherein the bus driver is an IEEE-1394 compliant bus driver.

7. The system of claim 5 wherein the device object is a virtual device object.

8. The system of claim 5 wherein the device driver is a virtual device driver.

9. The system of claim 2, wherein the node is configured to emulate multiple devices at the same time.

10. The system of claim 2, wherein the request to create a virtual device is sent by a user mode application.

11. The system of claim 2, wherein the at least one device is capable of being plugging natively into the serial bus.

12. The system of claim 11, wherein the at least one device capable of being plugging natively into the serial bus is selected from the group consisting of a printer, a scanner, camcorder, and a DVD drive.

13. The system of claim 2, wherein the at least one device object representing the device to be emulated remains present even if the node is rebooted.

14. The system of claim 2, further comprising:

an emulation driver, the emulation driver communicating with a second device connected to a disparate bus type.

15. The system of claim 14, wherein the emulation driver accepts communication native to the serial bus for the second device.

16. The system of claim 14, wherein the serial bus is an IEEE-1394 compliant serial bus, and wherein the disparate bus type is USB.

17. The system of claim 2, wherein the bus driver, in response to a request to remove the virtual device, removes the virtual device.

18. The system of claim 17, wherein the removing the virtual device comprises preventing the creation of the virtual device after a reboot.

19. The system of claim 18, wherein the preventing the creation of the virtual device after a reboot comprises removing a virtual device object entry from a registry.

* * * * *